Figure 1:
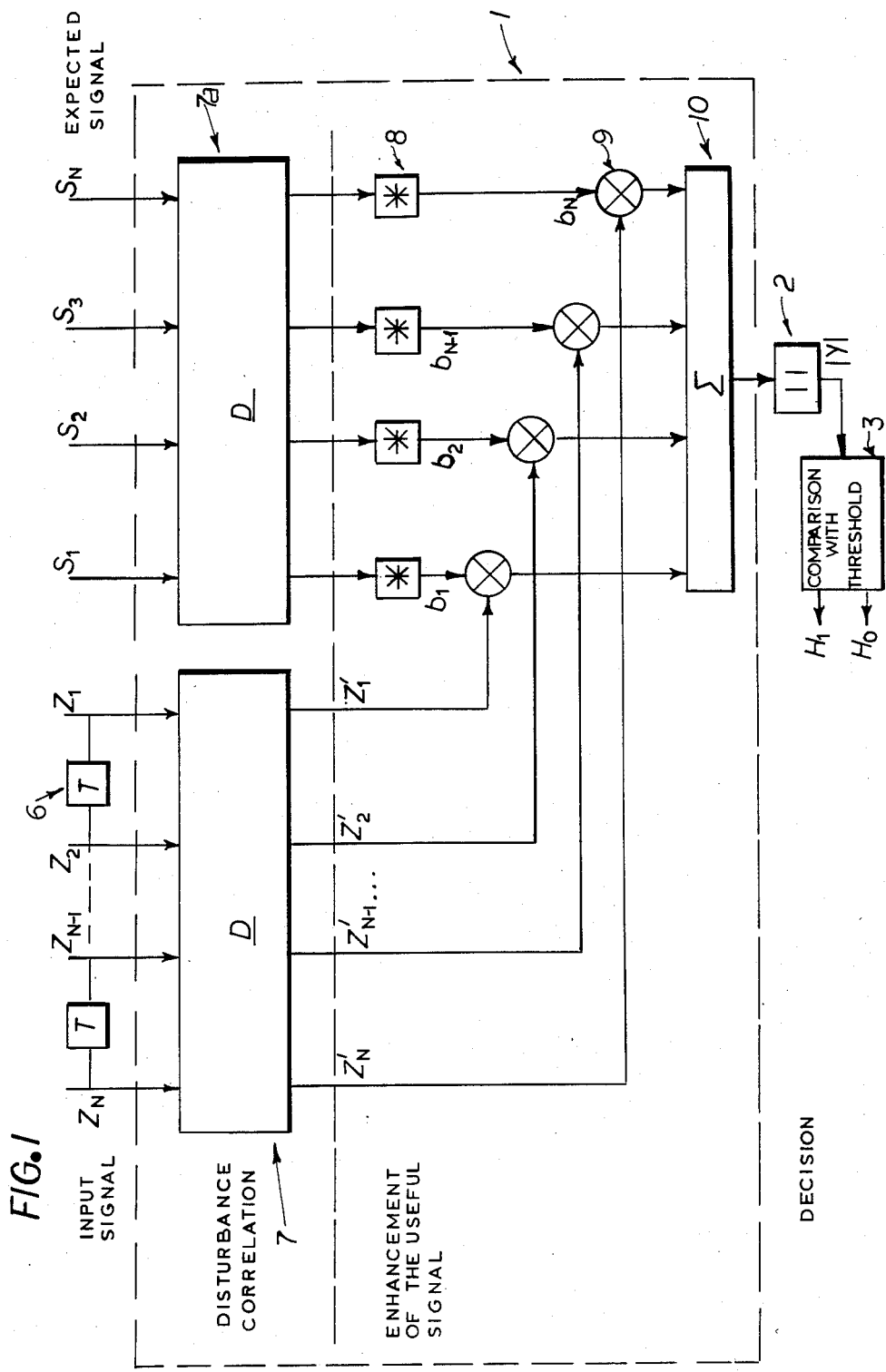

United States Patent [19]

Farina et al.

[11] Patent Number: 4,719,466
[45] Date of Patent: Jan. 12, 1988

[54] ADAPTIVE RADAR SIGNAL PROCESSOR FOR THE DETECTION OF USEFUL ECHO AND THE CANCELLATION OF CLUTTER

[75] Inventors: Alfonso Farina; Flavio A. Studer, both of Rome, Italy

[73] Assignee: Selenia-Industrie Elettroniche Associate S.p.A., Rome, Italy

[21] Appl. No.: 681,497

[22] Filed: Dec. 13, 1984

[30] Foreign Application Priority Data

Dec. 13, 1983 [IT] Italy .................. 49499 A/83

[51] Int. Cl.⁴ .............................................. G01S 7/66
[52] U.S. Cl. ................................. 342/159; 342/189; 342/194; 364/574
[58] Field of Search .............. 343/5 CE, 5 CF, 18 E, 343/380, 381, 382, 383, 384, 7.7; 342/17, 159–164, 189, 194, 380, 382–384, 89; 364/516, 517, 574, 724

[56] References Cited

U.S. PATENT DOCUMENTS

| | | | |
|---|---|---|---|
| 3,876,947 | 4/1975 | Giraudon | 343/383 X |
| 3,882,498 | 5/1975 | McGuffin | 343/7.7 X |
| 3,995,271 | 11/1976 | Goggins, Jr. | 343/7.7 X |
| 4,044,359 | 8/1977 | Applebaum et al. | 343/18 E X |
| 4,217,584 | 8/1980 | Lombardi et al. | 343/7.7 |
| 4,217,586 | 8/1980 | McGuffin | 343/380 |
| 4,439,770 | 3/1984 | Lewis et al. | 343/381 |

FOREIGN PATENT DOCUMENTS 1599035 9/1981 United Kingdom ............. 343/7.7

OTHER PUBLICATIONS

W. Gabriel, "Adaptive Arrays"; Proc. of the IEEE, (vol. 64, No. 2; 2/76; pp. 239–272).
"Theory of Adaptive Radar"; IEEE Trans. on Aerospace and Electronic Systems, pp. 237–252 (vol. AES-9, No. 2; 3/73).

Primary Examiner—T. H. Tubbesing
Assistant Examiner—Bernarr Earl Gregory
Attorney, Agent, or Firm—Karl F. Ross; Herbert Dubno

[57] ABSTRACT

Adaptive radar signal processor apt to detect the useful echo in the presence of an additive disturbance made up of clutter and noise, through which the disturbance can be cancelled and the useful signal can be enhanced by means of the synthesis of a filter, adapted to the useful signal, which rejects the disturbance spectrum frequency components by adapting itself in real time to its variations.

2 Claims, 5 Drawing Figures

ADAPTIVE RADAR SIGNAL PROCESSOR FOR THE DETECTION OF USEFUL ECHO AND THE CANCELLATION OF CLUTTER

FIELD OF THE INVENTION

The present invention belongs to the radar field. It refers to an adaptive processor which is able to detect the echo of a target in the presence of an additive disturbance made up of clutter and noise.

Such processor, in accordance with the invention, can be made integral part of a radar receiver. More in detail, it could be inserted after the coherent detection, in video band, of the radar signal.

BACKGROUND OF THE INVENTION

As a well known fact, surveillance radar performance may be significantly degraded by the presence of clutter echoes, which are characterized by parameters not known a priori and which vary in a random fashon.

To counter the effects of such disturbances, the techniques normally resorted to are the fixed MTI and the adaptive MTI. The acronym MTI, "Moving Target Indicator", is commonly in use by experts in the field and shall be used from here on for convenience.

In the case of fixed MTI (L. E. BRENNAN et Al. IEEE Trans. on AES Vol. AES-9, No. 2 March 1973) the clutter carrier frequency is assumed to be known and a fixed parameter filter is used to cancel it.

In the case of adaptive MTI (U.S. Pat. No. 4,217,584 GALATI LOMBARDI/SELENIA) the clutter carrier frequency is estimated from the signal received by the radar and the filter profile is shifted so as to overlay the disturbance spectrum with its opaque band.

These two techniques give way to the following drawbacks:
- fixed parameter filter, therefore predetermined filter profile;
- limited performance in the presence of more than one clutter signal;
- limited sensitivity of the useful signal;
- partly correlated cancellation residue which is therefore integrated in the following processing stages with a resulting higher false alarm probability.

OBJECT OF THE INVENTION

The processor, object of the present invention, eliminates such shortcomings. In fact the processor's parameters, as described in the following, change automatically as a function of the input disturbance and of the Doppler frequency of the expected useful signal.

SUMMARY OF THE INVENTION

The processor frequency response adapts to the effective need to cancel one or more clutter signals, without penalizing the useful signal. Further, the cancellation residue at the filter output is constituted by an uncorrelated process (white-noise) which is not integrated in the following processing phases.

Before describing the present invention in detail, it is opportune to make reference to the working principle of the optimum filter for radar signal processing (Brennan-Reed: Theory of Adaptive Radar, IEEE Trans. AES, March 1973), as the present invention is a processor which makes possible the implementation of such filter.

In theory, coherent processing must be performed on the echoes corresponding to the transmission of N pulses, in a given space direction, and at instants $t_1, t_2, \ldots t_N$, which are not necessarily equispaced.

The N echoes received by a generic range-bin may be represented in a compact form by the vector:

$$Z^T = [Z_1, Z_2, \ldots Z_N] \quad (1)$$

where $Z_i$, in complex notation, gives amplitude and phase of the echo related to the i-th pulse and therefore it contains the contribution of noise $n_i$, of clutter $c_i$ and of useful signal $S_i$ (if present). Samples "$S_i$" of the expected useful signal are given by a vector S:

$$S^T = [S_1, S_2, \ldots S_N] \quad (2)$$

Both the thermal noise and the clutter have a Gaussian distribution with zero mean.

Thermal noise is uncorrelated from pulse to pulse, whereas clutter may have any autocorrelation function.

The covariance matrix M of the disturbance can be derived from the total disturbance correlation proprieties. It can be demonstrated that the optimum processor is the one which carries out the following test:

$$/\underline{Z}^T \underline{M}^{-1} \underline{S}^* / \underset{<}{\overset{H_1}{\geq}} \lambda_{H_0} \quad (3)$$

To implement the optimum processor, the signals received must be delayed so as to render them contemporaneously available for processing and to combine them linearly by means of a filter having coefficients which are dependent upon M and S; such optimum filter output must be amplitude detected. The resulting value must then be compared with threshold $\alpha$, which is set on the basis of false alarm and correct detection probability requirements.

The optimum processor, till now, was known only as a theory because its practical implementation requires the knowledge of an estimated value of the matrix $M^{-1}$ on the basis of samples of the input signal.

With the present invention, the problem of determination of such matrix is resolved by resorting to the following relationships $$M^{-1} = D^T \cdot D^* \quad (4)$$

which holds true for Hermitian matrices and therefore also, in particular, for the covariance matrix M (W. F. Gabriel-"Adaptive Arrays, an Introduction" Proc. IEEE, February 1976). Such transformation enables us to express the optimum test as:

$$/(\underline{D}\,\underline{Z})^T (\underline{D}\,\underline{S})^* / \underset{H_0}{\overset{H_1}{\underset{<}{\geq}}} \quad (5)$$

the implementation scheme of which is given in FIG. 1. In such schematic, signals Z and S undergo the same transformation D; the signals thus obtained, respectively Z and b, are combined linearly to produce the output y.

The fundamental property of transformation D is that by acting upon samples of the total disturbance, it gives as an output a signal Z' which is made up of uncorrelated samples having equal power, having a covariance matrix which is an identity matrix. It is also observed that the preceding property is not altered by the presence of the useful signed S present at the input and added to the disturbance, because this alters only the expected values of Z and Z'. It therefore follows that the combination of signals Z' and b corresponds to the enhancement of the useful signal which may be present in Z.

The present invention is able to resolve, by means of adaptive techniques, the problem of transformation D implementation, and therefore that of the optimum filter, i.e. the disturbance cancellation function, therefore enhancing the useful signal.

In general transformation D is not known a priori, because the disturbance characteristics are unknown; in particular it's the covariance matrix M which is unknown. It is therefore necessary to make recourse to an adaptive implementation of device D.

Two characteristics single out the effectiveness of the adaptive device:

precision of the steady state estimate D, high speed to adapt to non stationary disturbance conditions.

Such requirements oppose each other, because to have a precise estimate the input data must be averaged over a significantly long observation time.

On the other hand, long adaption times are incompatible with the hypothesis made of stationarity clutter which holds true only over limited time intervals. Let us consider the operation of the adaptive processor in the time domain.

Let us consider N pulses transmitted by the radar and the related listening intervals.

For each interval, the responses obtained in K range bins are utilized, which give way to K independent vectors:

$$z_1, z_2, \ldots z_K$$

each one made up on N samples of the signal received. The estimate of the characteristics of the disturbance, and therefore of the transformation D can be derived by averaging the K independent groups of samples. It is therefore necessary that the value K be limited within the interval in which the disturbance is stationary.

The typical order of magnitude of "K" is a few tens of cells. The processor, object of the present invention, implements transformation "D" satisfying the two conflicting requirements indicated above.

BRIEF DESCRIPTION OF THE INVENTION

As an example, but not limited to this, in the following the invention will be described by making reference to the figures provided.

FIG. 1: General schematic of the optimum processor of radar signals

Figure 2:
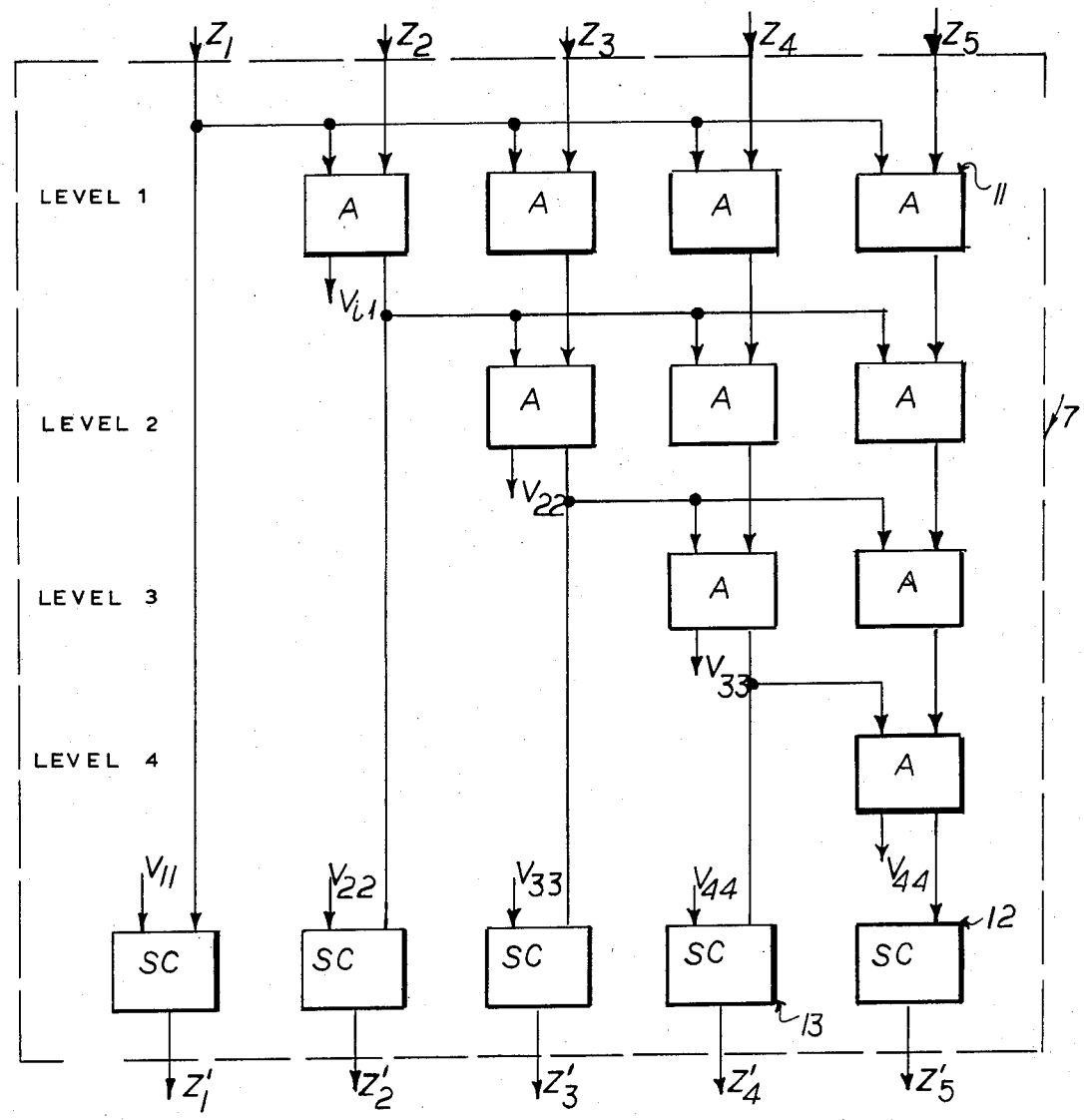

FIG. 2: Implementation of block D.

Figure 3:
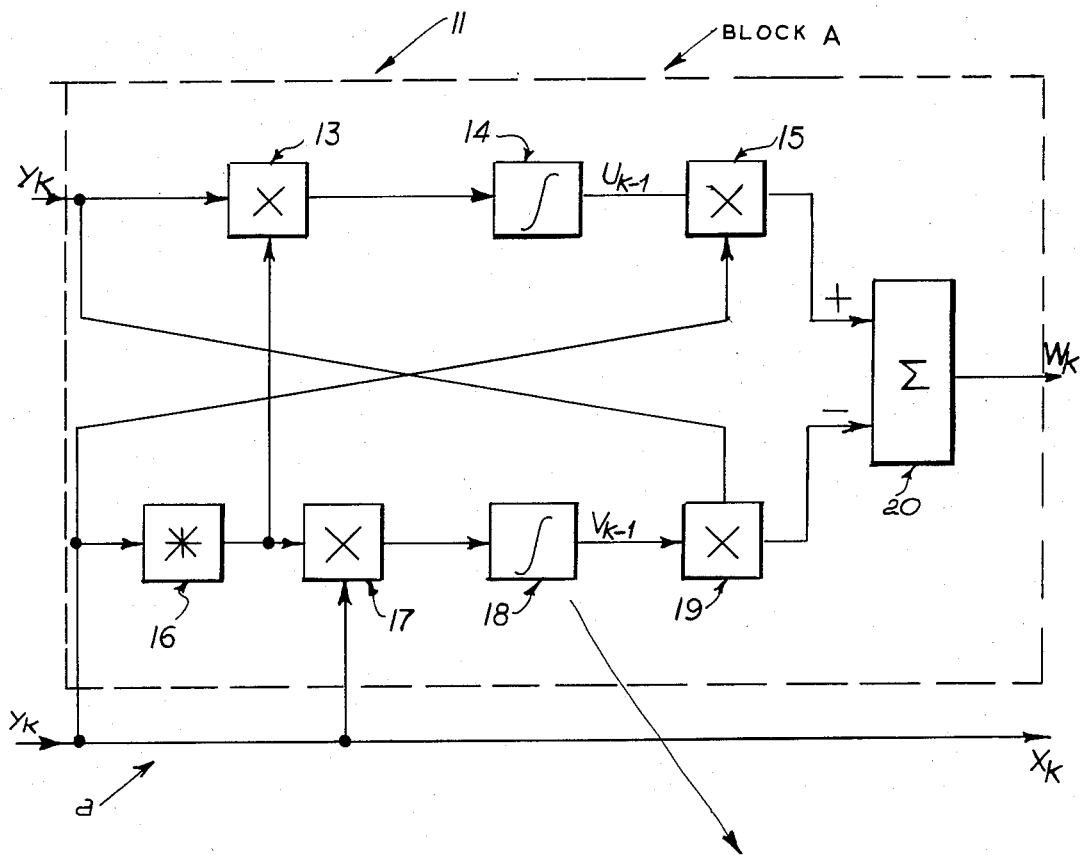
Figure 3:
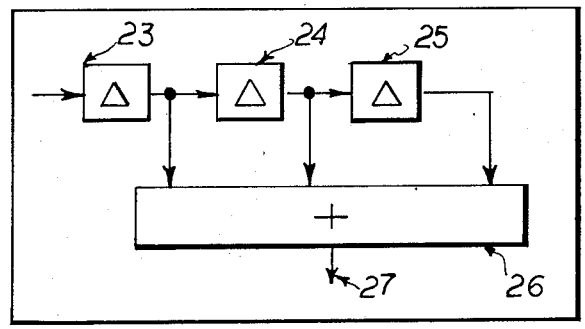

FIG. 3: Implementation of block "A" (elementary decorrelation device)

Figure 4:
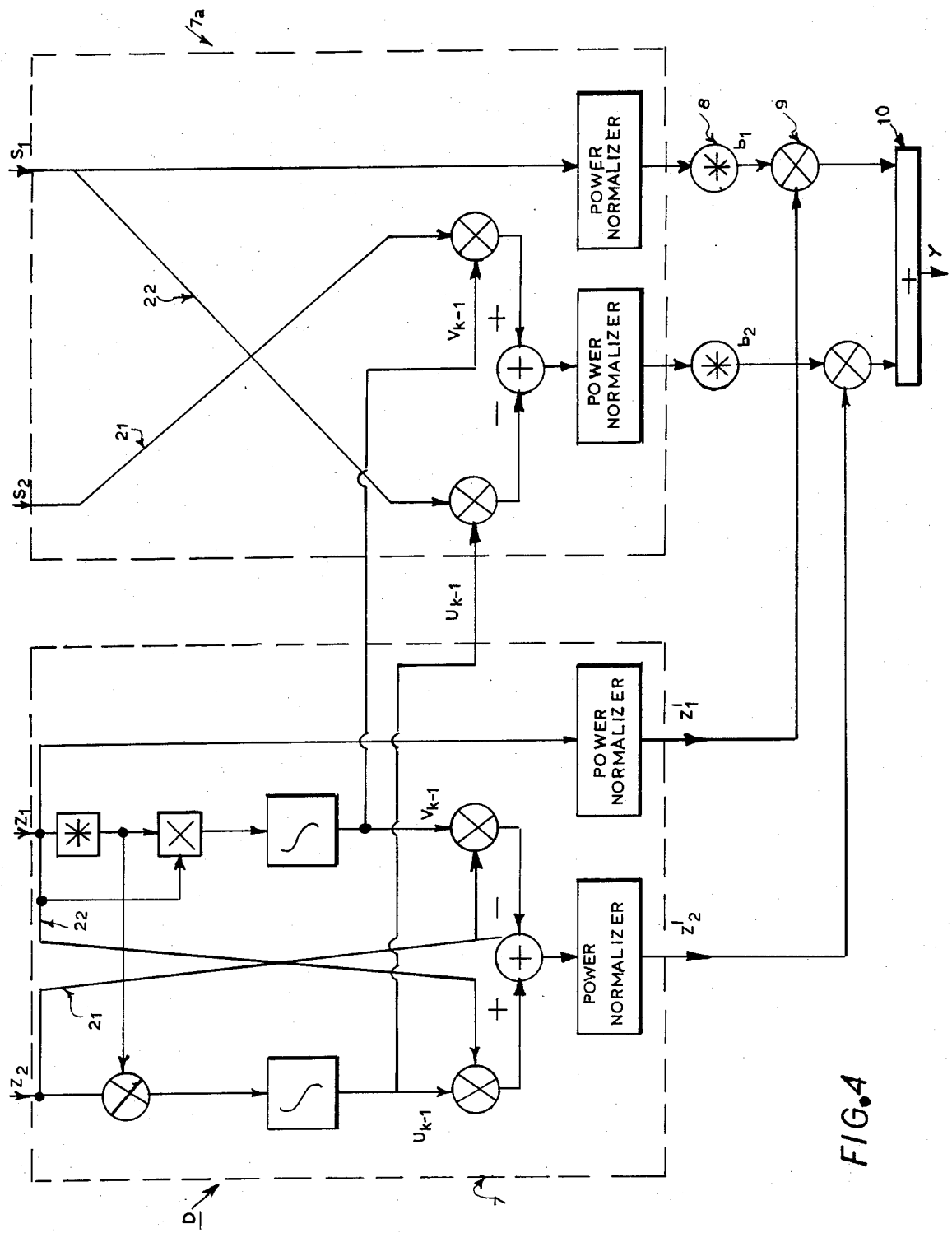

FIG. 4: Example of the processor for N=2 pulses

Figure 5:
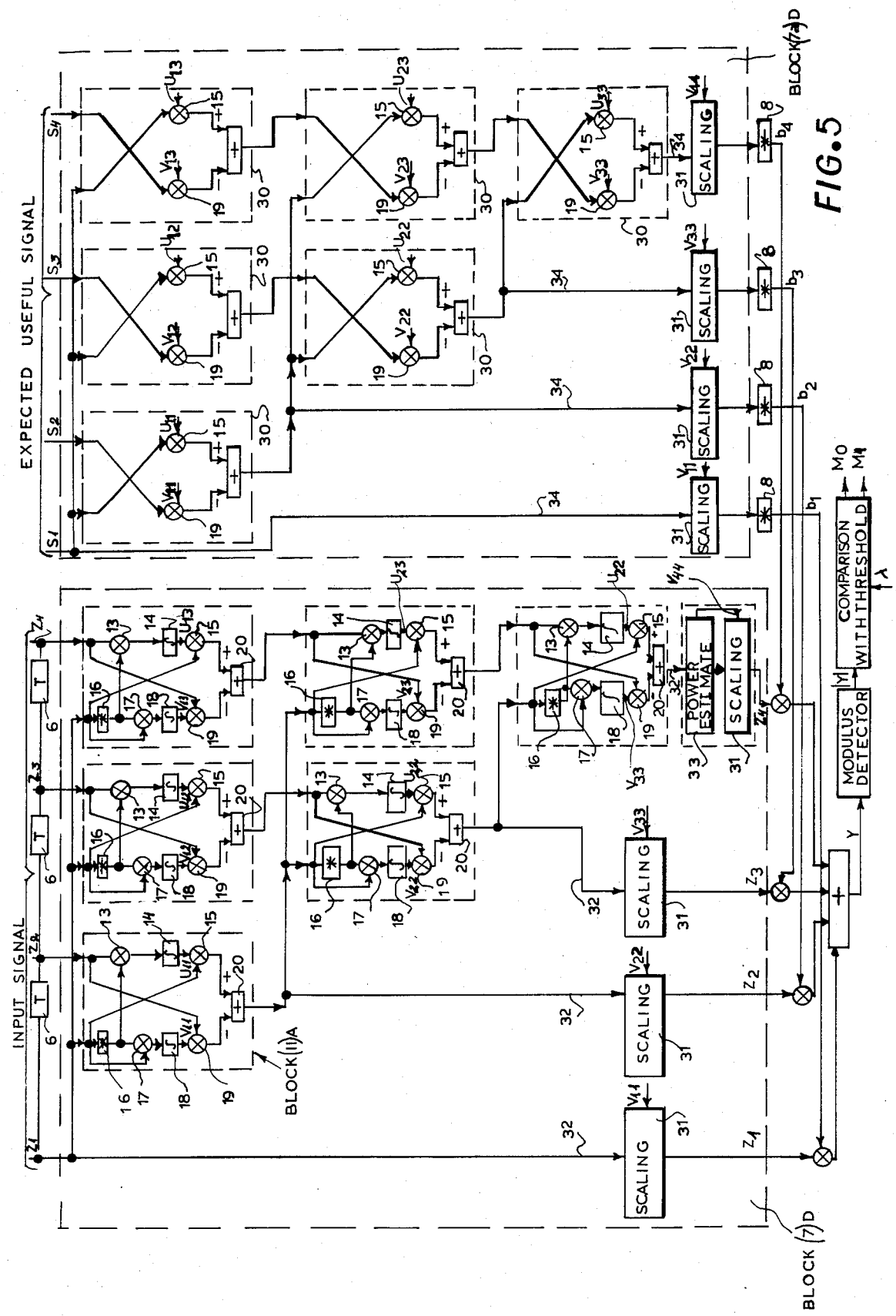

FIG. 5: General schematic of the processor in its preferred configuration

SPECIFIC DESCRIPTION

FIG. 1 gives the general schematic of the optimum radar signal processor where Z is the input signal to block D (7) which performs the disturbance decorrelation; S is the expected signal, processed by means of block D (7a); y is the output obtained as a combination of signals Z' and b through multipliers (9) and the summing circuit (10); block (2) extracts the y modulus which is compared to the threshold in block (3).

The present invention regards the implementation of blocks D (7) and (7a), and has, as an aim, the implementation of the optimum processor given in FIG. 1.

Now the invention in its preferred implementation will be described following the illustration in FIG. 2, which is the most significant in highlighting the invention itself. It may be remembered that the function of transformation D is that of obtaining a group of N signals $Z_i$, uncorrelated and having unity power, starting from the input signals $Z_1$ which are correlated.

To this end, different pairs of signals, which are made to be mutually uncorrelated, are taken into examination. The processing is organized in successive levels from 1 to $N-1$: a signal is taken as reference at each level and is uncorrelated with respect to all further signals having the same level and than its power is normalized.

In particular, in the case N=S given as an example in FIG. 2, signal $Z_1$ is compared in blocks A at level 1 respectively with signals $Z_2$, $Z_3$, $Z_4$, $Z_5$; at the output of each block A a signal corresponding to the component of input signal ($Z_2$, $Z_3$, $Z_4$ and $Z_5$) is obtained which is uncorrelated with reference signal $Z_1$.

The signals thus obtained are sent to the next level where $Z_1$ is not modified until it is normalized and the function of the reference signal is performed by the residual component of $Z_2$ (i.e. is cleared of $Z_1$) obtained at the output of the first block A.

At level 2, the residual components of $Z_3$, $Z_4$, $Z_5$ are freed of the component correlated with the new reference and are sent to the next level and so on till N mutually uncorrelated signals are obtained.

The process described corresponds to the cancellation of the clutter component present in the input signals.

The last transformation necessary to obtain output $Z^1$ is the power normalization of the signals: this requires an estimate of the power of the signals themselves and further their division by an opportune scaling factor.

As detailed further ahead, the preferred implementation for block A contains an estimate of the reference signal power; therefore the scaling operation can be made directly on the signals obtained by transformation of $Z_1$, $Z_2$, $Z_3$ and $Z_4$ by means of coefficients $V_{11}$, $V_{22}$, $V_{33}$ and $V_{44}$ indicated in FIG. 2. For the signal obtained from $Z_5$ on the contrary, it is required to have an estimate of power because it never appears as a reference signal. Therefore in FIG. 2, N−1 scaling blocks SC, which are meant for signal scaling, have been indicated and also a power normalizing block NP which effects both power estimate and scaling.

The structure given in FIG. 2 is particularly useful for a rapid implementation of the adaptive processor. In fact it does not contain any feedback loops which could give way to stability problems, or to an extremely slow adaptation transient. The processing structure has also a high degree of parallelism from which two relevant consequences derive. From the functional viewpoint, blocks A of the same level operate simultaneously and independently; in this way the whole structure reaches steady state within a time limit which depends on the number of levels.

Furthermore, the implementation of device D is modular. In all, N(N−1)/2 blocks A are necessary for the implementation, (N−1) scaling blocks SC and one normalizing block NP. In order to describe how the generic block (A) in FIG. 2 may be implemented, let us consider in greater detail which processing activities it must carry out.

Let $Y_K$ and $X_K$ be respectively the input and the reference signals for the generic block A and $W_K$ the corresponding output.

Output $N_K$ must be uncorrelated to reference input $X_K$, i.e.:

$$E\{W_K X^*_K\} = \gamma \tag{6}$$

The schematic given in FIG. 3-a gives a preferred implementation of block "A", based upon equation (6), giving the following output:

$$W_K = X_K E\{Y_K X^*_K\} - Y_K E\{X_K X^*_K\} \tag{7}$$

It is simple to verify that the output thus obtained satisfies condition (6). More in detail, output WK is obtained from the difference of two terms:

$$W_K = (X_K \cdot U_{K-1}) - (Y_K \cdot V_{K-1}) \tag{8}$$

Coefficients $U_{K-1}$ and $V_{K-1}$ represent estimates of the correlation between Y and X and of the power of X. The correlation is obtained by multiplying, within block (13), the signal $Y_K$ with the complex conjugate of $X_K$, block (16) and by integrating such product through block (18).

FIG. 3-b gives the detail, in an illustrative and not limiting manner, a possible implementation of an integrator, (blocks (14) and (18) of FIG. 3-a), under the assumption that the processing is made adopting digital techniques. The integrator is implemented as a transverse filter, formed by a number of delay elements (blocks (23), (24), (25)) and by a summing block (26) which produces an output (27) equal to the sum of the signals present in the delay blocks themselves.

Delay $\Delta$ is equal to the time duration of a range-bin and therefore corresponds to integrating the K range-bins nearby. The number of samples summed up together characterizes the integrator memory and is selected so as to satisfy the two opposing requirements, already mentioned, for precise and rapid estimates.

The implementation of block "A" by means of the schematic of FIG. 3-a 3-b, confirms the selection of processing structures which are stable and fast, that is without any feedback, as already mentioned for FIG. 2.

We emphasize that the calculation of coefficient $V_{K-1}$ corresponds to the estimate of the reference input power. Such datum may be used for signal normalization, as already explained in the illustration of FIG. 2.

In FIG. 4, the most simple configuration of the processor is given, i.e. the case for N=2 pulses.

For all the range-bins taken into examination samples $Z_1$ and $Z_2$ at the input to the processor are made up of clutter and noise; the useful signal is on the contrary present in a single range-bin.

It is assumed that the time duration of the disturbance is sufficient to take estimates U and V of block (7) to a steady state. When also the useful signal is present at the input, it does not affect these estimates for the following reasons:

it generally has less power than the disturbance
it has a much shorter time duration than the integrator memories.

Within the range bins where the useful signal is contained, outputs $Z'_1$ and $Z'_2$ contain both the components of such signal and the disturbance components, uncorrelated and at unit power level.

At the same time, in block D (7a), the known samples of the expected signal, $S_1$ and $S_2$, undergo the same combination with coefficients U and V already estimated, and further give way in $b_1$ and $b_2$ to components matched to those present in $Z'_1$ and $Z'_2$. By means of the multiplying blocks (9) and the summing block (10), the linear combination of $Z'_1$ and $Z'_2$ is performed with weights $b_1$ and $b_2$ respectively, so as to obtain output y, the modulus of which is further compared with the threshold as shown in the general schematic of FIG. 1.

It is necessary to emphasize that the coefficients U and V of block (7a) are exact replicas of those of block (7), that is, they depend exclusively on the disturbance signal which is present at $Z_1$ and $Z_2$. For this reason it is not necessary to repeat, in block (7a), the estimation structure by means of the integrators present in block (7). Finally, the transformation, made by block (7a) on $S_1$ and $S_2$ coincides with that performed at steady state by block (7) on $Z_1$ and $Z_2$ and such transformation is just the one indicated by D. To conclude, FIG. 4 shows the calculation of output y starting from signals $Z'_1$ and $Z'_2$ and from coefficients $b_1$ and $b_2$, on which test (5) is performed as shown in the general schematic of FIG. 1.

In FIG. 5, the general schematic of the processor is given in its preferred configuration, to best synthesize the description of the invention, already given in detail as a commentary to FIGS. 1, 2, 3 and 4.

FIG. 5 refers, as an example, to the case of four processed pulses (N=4).

In such figure it is shown how samples $Z_1$, $Z_2$, $Z_3$, $Z_4$, of the input signal are processed in block (7), whereas samples $S_1$, $S_2$, $S_3$, $S_4$ which represent the useful signal expected are processed in block (7a); the two blocks (7) and (7a) have the same structure, being made up of 6 blocks (11) and (30) respectively (blocks A in FIGS. 2, 3, 4). It is important to note how blocks (30) are a simplified version of blocks (11), as they have the only function of combining the input signals with the opportune coefficients; the coefficients U and V of such combinations are provided by corresponding blocks (11) which also perform the estimate function as described in detail in the commentary to FIG. 3. Therefore each block (30) contains only multipliers (19) and (15) and summing block (20).

Still in FIG. 5, blocks (31) are shown, which carry out the scaling of signals (32) using the power estimates V of blocks (11) and the power normalizing block (2) where the estimate function (33) is distinct from the scaling one (13). Within block (7a) only scaling blocks (31) appear correspondingly, as the power estimate is provided by the V signals of block (7).

Finally the devices which perform the operation of "complex coniugate (8), multiplication (9) and sum (10) are shown to obtain output y.

As already described in the commentary to FIG. 2, this signal is further modulus detected (block 2) and compared with the threshold of block (3) to detect the target presence. To conclude, the processor, object of the present invention, gives the following advantages over previous techniques:

the filtering profile is not rigidly set, but it adapts automatically to the changing and unpredictable characteristics of the input disturbance;
the processor estimates the disturbance parameters in a limited time (a few distance bins), that is, within the stationarity interval of the disturbance itself;

the accuracy with which the processor evaluates such parameter enables to reach useful signal detection performances in presence of a disturbance, very close to the optimum value which can be derived from the theory.

We claim:

1. An adaptive radar signal processor for the detection of a useful signal of received signals in the presence of an additive disturbance in the form of clutter and noise comprising a modular structure of decorrelators and of a series of power normalizers through which parameters of said processor can be modified automatically as a function of the characteristics of the disturbance and of the useful signal, each of said decorrelators having a lattice structure comprising:

calculating means for calculating the complex conjugate function of expected useful signals forming complex conjugate signals;

a first multiplier coupled to an output of said calculating means for multiplying said complex conjugate signals with said expected useful signals;

a second multiplier coupled to said calculating means for multiplying said complex conjugate signals with said received signals;

first integrating means coupled to said first multiplier;

second integrating means coupled to said first multiplier;

a third multiplier coupled to said first integrator for multiplying an output of said first integrator with said received signals;

a fourth multiplier coupled to said second integrator for multiplying an output of said second integrator with said expected useful signals; and summing means coupled to said third multiplier and said fourth multiplier for adding outputs of said third multiplier and said fourth multiplier forming power and correlation estimate signals whereby said power and said correlation estimate signals are utilized both for power normalization and for linear processing of samples of an expected target signal.

2. An adaptive radar signal processor for the detection of a useful signal of received signals in the presence of an additive disturbance in the form of clutter and noise comprising a modular structure of decorrelators and of a series of power normalizers through which parameters of said processor can be modified automatically as a function of the characteristics of the disturbance and of the useful signal, with an entirely transversed configuration devoid of feedback, and each of said decorrelators having a lattice structure comprising:

calculating means for calculating the complex conjugate function of expected useful signals forming complex conjugate signals;

a first multiplier coupled to an output of said calculating means for multiplying said complex conjugate signals with said expected useful signals;

a second multiplier coupled to said calculating means for multiplying said complex conjugate signals with said received signals;

first integrating means coupled to said first multiplier;

second integrating means coupled to said first multiplier;

a third multiplier coupled to said first integrator for multiplying an output of said first integrator with said received signals;

a fourth multiplier coupled to said second integrator for multiplying an output of said second integrator with said expected useful signals; and summing means coupled to said third multiplier and said fourth multiplier for adding outputs of said third multiplier and said fourth multiplier forming power and correlation estimate signals wherein said power and said correlation estimate signals are utilized both for power normalization and for linear processing of samples of an expected target signal.

* * * * *